United States Patent [19]

Mantegazza

[11] Patent Number: 5,190,318
[45] Date of Patent: Mar. 2, 1993

[54] DOCUMENT WITH FORGERY-PREVENTION MEANS

[75] Inventor: Antonio Mantegazza, Noverasco di Opera, Italy

[73] Assignee: Engimpex Ltd., Dublin, Ireland

[21] Appl. No.: 717,309

[22] Filed: Jun. 17, 1991

[30] Foreign Application Priority Data

Jun. 22, 1990 [IT] Italy ............................... 20727 A/90

[51] Int. Cl.$^5$ ............................................. B42D 15/00
[52] U.S. Cl. ........................................ 283/82; 283/58; 283/901; 40/299; 235/379; 235/493
[58] Field of Search ............................ 283/82, 83, 901; 283/57, 58, 59, 70, 91; 40/299; 235/379, 493

[56] References Cited

U.S. PATENT DOCUMENTS

| 4,186,944 | 2/1980 | Pearce | 283/82 |
| 4,925,215 | 5/1990 | Klaiber | 283/82 |
| 4,943,093 | 7/1990 | Melling et al. | 283/901 X |
| 5,016,919 | 5/1991 | Rotondo | 283/82 |
| 5,032,709 | 7/1991 | Lee et al. | 283/82 |

FOREIGN PATENT DOCUMENTS 1464409 0/0000 United Kingdom .
W085/02148 0/0000 WIDO .

Primary Examiner—Timothy V. Eley
Assistant Examiner—Willmon Fridie, Jr.
Attorney, Agent, or Firm—Herbert Dubno

[57] ABSTRACT

The document, particularly of the check type, with forgery-prevention means, includes a sheet-like element which has at least one portion for writing indications. In the at least one indication-writing portion, regions made of magnetic material spaced by magnetically blank portions are provided so as to define a code which can be detected by a magnetic reading head. The regions made of magnetic material are impressed with a magnetic material which can be erased by chemical and/or mechanical action.

10 Claims, 2 Drawing Sheets

DOCUMENT WITH FORGERY-PREVENTION MEANS

BACKGROUND OF THE INVENTION

The present invention relates to a document, particularly of the check type, with forgery-prevention means.

As is known, a problem which is currently strongly felt in various fields, and especially in the case of checks, is the one related to the possibility of preventing the forgery and counterfeiting of the document.

The term "counterfeiting" is used herein to describe the possibility of performing a fraudulent reproduction or imitation of the document, whereas the term "forgery" is used herein to describe the possibility of altering parts of said document and, especially in the case of checks, the spaces where the digits are indicated, where the signature is placed, and so forth.

The code known as CMC7 is currently used for checks drawn on current accounts; in practice, said code prints on the check a magnetic bar code, capable of also writing in unencoded form the reference number, which can be read by a magnetic reading head for the encoding of the number of the check.

Said code is currently used as an element which allows to automatically detect the means of reference of the check, and can act as a counterfeiting-prevention element, since its absence indicates an unlawful reproduction or imitation of the check, but it is unable to constitute a forgery-prevention means, i.e. it cannot in any way point out the occurrence of the forgery of the amounts or other items written on the check.

On the other hand, all the means currently used to act as forgery-prevention element, such as for example the use of erasable inks in the region where the numbers related to the amount are applied, have not always proved themselves capable of making immediately evident the forgery of the amounts or other data, and most of all the detection of such forgery could be performed only visually and not automatically, so that the forger had the possibility of "reconstructing" the region where he had modified the amounts or data, thus making the forgery difficult to detect.

SUMMARY OF THE INVENTION

The aim of the invention is indeed to solve the above described problem by providing a document, particularly of the check type, which has forgery-prevention means which can be detected automatically by a magnetic reading head, thus preventing the possibility of concealing the forgery.

Within the scope of the above aim, a particular object of the invention is to provide a document wherein the forgery-prevention means can be integrated in other elements which are normally provided in a check, so that said means are not immediately perceivable to the naked eye.

Another object of the present invention is to provide a document, particularly of the check type, which by virtue of its peculiar characteristics of execution is capable of giving the greatest assurances of reliability and safety in use.

Not least object of the present invention is to provide a document, particularly of the check type, with forgery-prevention means which can be obtained for example by using a magnetic or magnetizable ink which is the subject matter of Italian Patent Applications 20725 A/90 filed Jun. 22, 1990 and MI91A001494 filed May 31, 1991 by the same applicant.

This aim, these objects and others which will become apparent hereinafter are achieved by a document, preferably of the check type, with forgery-prevention means, according to the invention, comprising a sheet-like element provided with at least one portion for writing indications, characterized in that it comprises, in said at least one indication-writing portion, regions made of magnetic material so as to define a code which can be detected by a magnetic reading head, said regions made of magnetic material being impressed with a magnetic material which can be erased by chemical and/or mechanical action. Advantageously, the magnetic material regions of the document according to the present invention are spaced by magnetically blank portions.

BRIEF DESCRIPTION OF THE DRAWINGS

Further characteristics and advantages will become apparent from the description of a preferred but not exclusive embodiment of a document, particularly of the check type, with forgery-prevention means, illustrated only by way of non-limitative example in the accompanying drawings, wherein.

DESCRIPTION OF THE PREFERRED EMBODIMENTS

Figure 1:
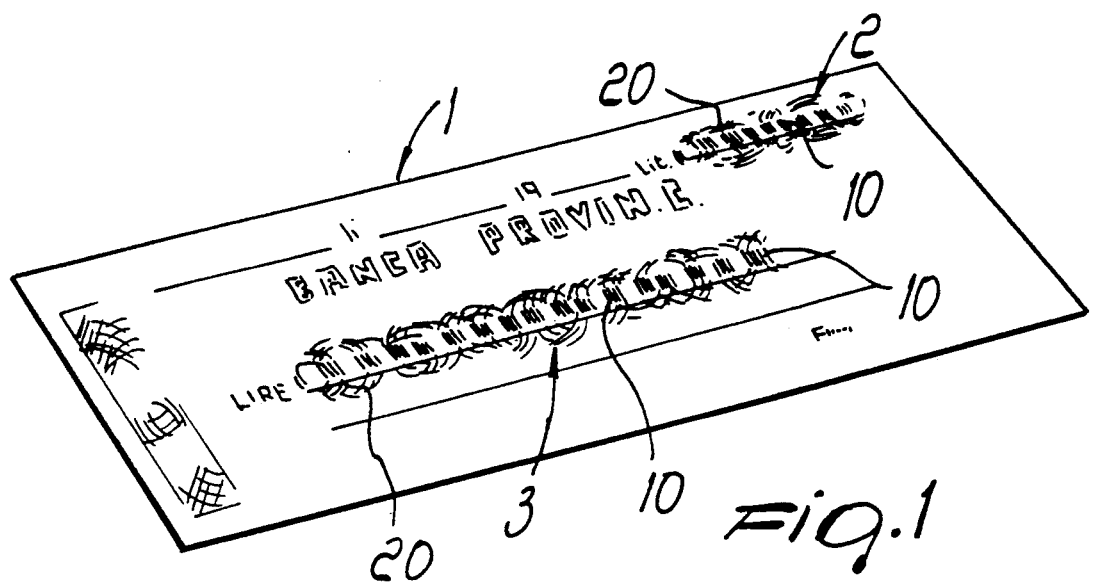
FIG. 1 is a schematic perspective view of a particular embodiment of a document according to the invention, which in this case is constituted by a check.
Figure 2:
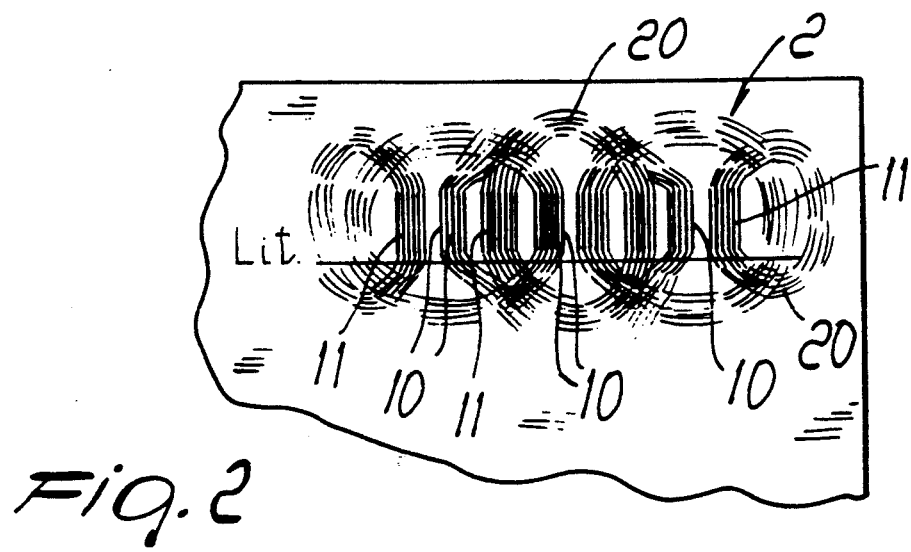
FIG. 2 is an enlarged-scale view of the portion of the check of FIG. 1 where the amount is written in numbers, and wherein the regions made of magnetic material are pointed out.
Figure 3:
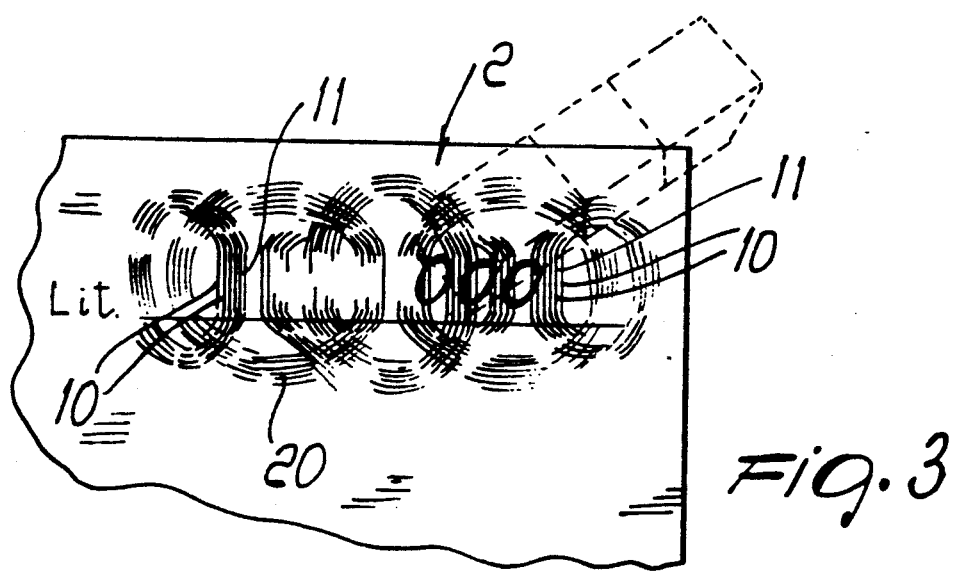
FIG. 3 is a schematic view of the portion of FIG. 2, wherein the variation or removal of the regions made of magnetic material upon an attempt at fraudulent modification of the written amount is pointed out.

With reference to the above figures, the document, particularly of the check type, with forgery-prevention means, according to the invention, comprises a sheet-like element, indicated by the reference numeral 1, which in the specific case of checks can be constituted by a paper sheet, with or without a watermark, which defines a first portion 2 for indicating the amount in numbers and the conventional second portion 3 for indicating the amount in letters in full.

The peculiar characteristic of the invention is constituted by the fact that regions made of magnetic or magnetizable material, spaced by magnetically blank regions, so as to provide a code which can be detected by a magnetic reading head, are applied in said portions 2 and 3.

Figure 4:
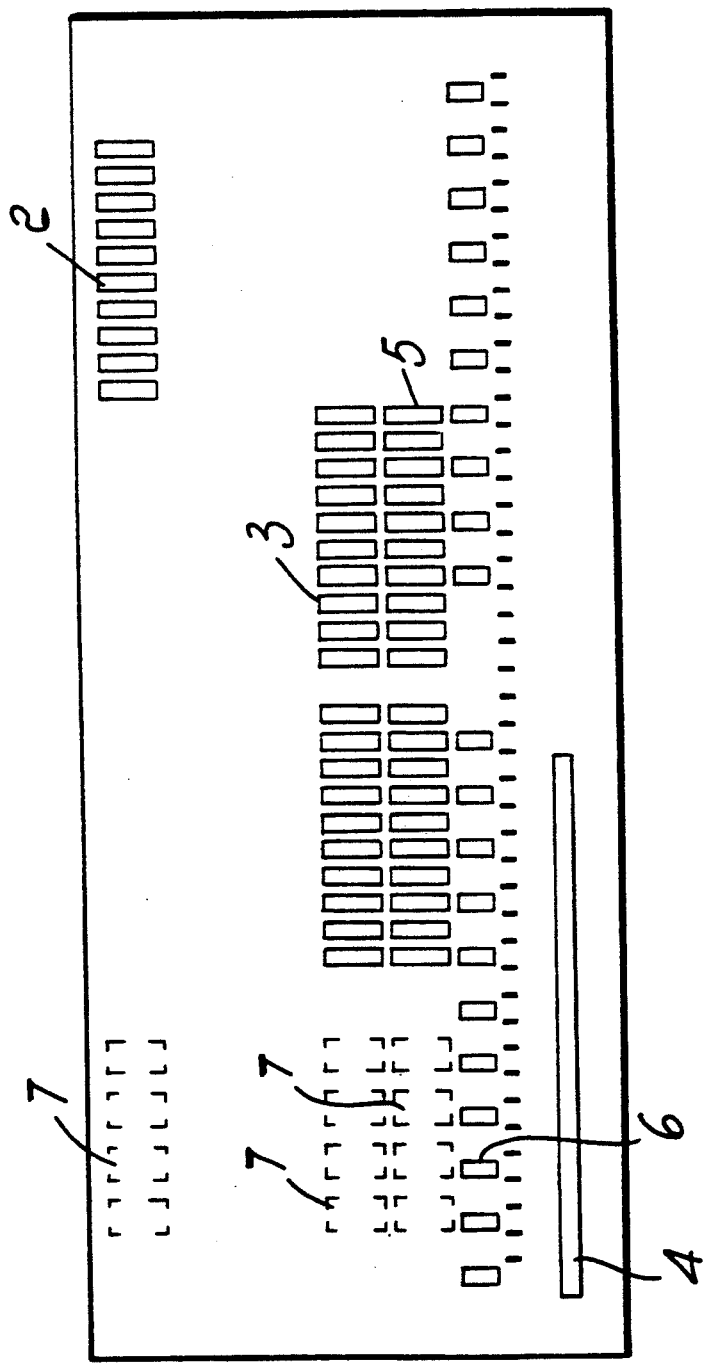
FIG. 4 is a view of a possible form of mapping of the check of FIGS. 1-3, i.e. of the parts where the regions made of magnetic material are placed.

Furthermore, as schematically indicated in FIG. 4, the document, constituted for example by a check, can have a field 4 for numbering the check by means of the conventional magnetic code of the CMC7 type or of the E13B or OCR type optical code or equivalent codes; in the case of CMC7 code, said code is, as usual, printed with non-erasable magnetic ink.

Besides said portions 2 and 3, it is possible to provide a third portion 5 having regions made of magnetic or magnetizable materials, where the payee of the check is indicated, and a fourth portion 6 with magnetic regions at the digits which are perforated or obliterated in a cashier's check.

On the back of the document it is possible to provide rear portions 7 at the points where the endorsement signatures are placed; advantageously, said rear portions are placed in regions which are not affected by the portions 2, 3, 4, 5 and 6 described above, so that they can be detected with magnetic reading heads arranged on the front side.

It is advantageous, although not necessary, to use, in the portion 2, a ten-digit code which, for example, repeats twice the bank routing code of the check.

In the portions 3 and 5 it is possible to use a code having a first part which is identical to that of the portion 2 and a second part which is constituted by a string of characters, wherein some characters can identify whether the document is: a bank check printed from fanfold forms, a bank check taken from a checkbook, a cashier's check within a preset value bracket; other characters can, for example, identify the printing batch and the production year, other characters the print shop and any further indications.

The magnetic material can be inserted and mixed in offset ink, flexographic ink, screen process ink, copperplate printing ink, ink-jet ink, luminescent ink, fluorescent ink, phosphorescent ink, infrared ink, dichroic ink etc., or can be spread and/or deposited on ribbons for impact, dot-matrix and laser printers.

Said regions can be constituted by letterings, patterns, symbols or by any other element the position whereof can allow to provide a code.

Preferably, but not necessarily, the regions made of magnetic material are provided by means of markings 10 spaced by blank spaces 11 which can, but do not necessarily, correspond to the CMC7 code already adopted for other purposes on checks, so that said code can be detected with the machines already normally in use.

A further safety element is constituted by the fact that said markings 10 are embedded in patterns which constitute the normal safety printings or patterns, indicated by 20, so that said markings cannot be easily perceived optically since, although they are present, they constitute an integral part of the safety pattern or printing.

Said markings, like any pattern possibly adopted, can furthermore be obtained with very light colors or with any other color which allows good concealment thereof.

The peculiar characteristic is constituted by the fact that said markings are printed with magnetic ink which can be erased by both chemical and mechanical action, so that any fraudulent attempt at modification or removal of the originally written amount causes the breakage, the erasure or in any case the modification of the markings made of magnetic material, so that upon verification, beneath the magnetic reading head, the original code can no longer be detected, thus obtaining an element which immediately points out the forging of the document.

Such magnetic or magnetizable ink, which has the property of being erasable, is characterized in that it comprises a mixture of water, gum arabic, colored pigment and magnetic material finely ground and mixed with an easily hydratable vehicle.

More particularly, the erasable magnetic ink according to the present invention contains magnetic particles obtained from ferrite (ferric oxide) of the gamma type with initial acicular (needle-like) particles of 0.001 by 0.006 mm, with a ratio of 1/6, which can be ground with a collidal hypervelocity mill having zirconium oxide spheres, in a Fryma type microsphere agitator having a kinetic chamber, until the particles are brought to a size of 0.004 mm with a ratio of $\frac{1}{4}$.

Such ground ferric oxide is then mixed with an easily hydratable vehicle, such as glycerol, sorbitol or the like, which has the function of creating, for the chemical aggression of the ink, a repositioning of the magnetic material particles and consequently a modification of the initial conditions which helps to render evident an eventual forgery attempt.

The magnetic ink is obtained with a mixture of 10–15% of magnetic material as described above, 10–15% of colored pigment, combined with water by 10–15%, 10–15% of glycerol, 30–35% of arabic gum, and mineral content of 5–10%.

The spacing of the magnetic bars 10 with non-magnetic bars further permits an optical reading head to detect a forgery and thus the counter-code, in addition to the magnetic code, acts as a check of authenticity. An optical reading head, for example comprising optical fibres of 50 microns mounted on two axes, will detect all bars present, either magnetic or non-magnetic. Thus, any type of intervention, either chemical or mechanical, which removes the bars, will be simultaneously or non-contemporarily detected by a magnetic reading head and/or an optical reading head.

From what has been described above it can thus be seen that the invention achieves the intended aim and objects, and in particular the fact is stressed that the provision of regions made of magnetic material in the region where the check is normally written by the maker constiutes an element of great safety against forgings, since any attempt at forgery would cause the breakage or modification of the region made of magnetic material, with the consequent impossibility, for the magnetic reading head, to fully detect the originally applied code.

The invention thus conceived is susceptible to numerous modifications and variations, all of which are within the scope of the inventive concept.

All the details may furthermore be replaced with other technically equivalent elements.

In practice, the materials employed, as well as the dimensions and the contingent shapes, may be any according to the requirements.

I claim:

1. Document, particularly of the check type, with forgery-prevention means, comprising a sheet-like element, said sheet-like element having at least one surface, said at least one surface of said sheet-like element having at least one portion for writing indications, wherein said document further comprises regions made of magnetic material so as to define a code which can be detected by a magnetic reading head, said magnetic material being an erasable magnetic material, said regions made of erasable magnetic material being provided at said at least one indication-writing portion on said at least one surface of said sheet-like element.

2. Document according to claim 1, wherein said regions made of magnetic material are spaced by magnetically blank portions.

3. Document according to claim 1, wherein it comprises a first portion for writing the amount in numbers and a second portion for writing the amount in letters in full, said regions made of magnetic material being provided in at least one of said portions.

4. Document according to claim 3, wherein it comprises a third portion provided with said regions made of magnetic material at the region where the payee of the check is applied.

5. Document according to claim 1, wherein it comprises a fourth portion provided with said regions made of magnetic material at the points of perforation or obliteration of the numbers of a cashier's check.

6. Document according to claim 1, wherein said regions made of magnetic material are constituted by magnetic markings which are spaced by blank spaces for constituting a magnetic marking code.

7. Document according to claim 1, wherein it comprises safety patterns or printings which integrate with said markings made of magnetic material which constitute a portion of said safety pattern or printing.

8. Document according to claim 1, wherein it comprises markings made of non-magnetic material which are identical in configuration and spacing with respect to said markings made of magnetic material and are arranged between said markings made of magnetic material so as to optically conceal said magnetic markings.

9. Document according to claim 1, wherein it comprises rear portions with markings made of magnetic material which are arranged on the back of the document and are arranged offset with respect to said portions with magnetic regions provided on the front of the document.

10. Document according to claim 1, wherein said erasable magnetic material is constituted by erasable magnetic ink.

* * * * *